United States Patent [19]
Snell et al.

[11] 4,305,621
[45] Dec. 15, 1981

[54] VEHICLE WHEELS

[76] Inventors: Thomas B. Snell, Hillview, Penn La., Hardington Mandeville, Yeovil, Somerset; Nigel R. Smith, Penn Hill Farm, Pendower, Yeovil, Somerset; Richard H. Horsington, Manor Farm, Sandford Orcas, Sherborne, Dorset, all of England

[21] Appl. No.: 144,849

[22] Filed: Apr. 29, 1980

[51] Int. Cl.³ .............................................. B60B 15/00
[52] U.S. Cl. ................................. 301/40 S; 152/331; 152/415; 301/41 W
[58] Field of Search .......... 301/37 SC, 37 AT, 37 R, 301/38 R, 39 T, 40 S, 41 R, 41 W, 39 R, 40 R; 152/330 R, 331, 152, 156, 208, 354, 415

[56] References Cited

U.S. PATENT DOCUMENTS

| | | |
|---|---|---|
| 2,780,497 | 2/1957 | Cameron .......................... 301/41 W |
| 3,092,420 | 6/1963 | Baldwin et al. ................ 301/37 SC |
| 4,007,968 | 2/1977 | Solis ................................ 301/38 R |

FOREIGN PATENT DOCUMENTS 1301940  1/1973  United Kingdom ............. 301/41 R

Primary Examiner—John E. Kittle
Assistant Examiner—Thomas E. Bokan
Attorney, Agent, or Firm—Andrus, Sceales, Starke & Sawall

[57] ABSTRACT

A vehicle wheel attachment offers an increased tread to support the vehicle on soft ground, snow or sand. A rigid version has a body (5) of revolution which is clamped co-axially against the wheel (1) using a screw device (7,19) anchored to the studs which mount the wheel. The body is generally frusto-conical and may be made buoyant or be ballasted. There are also inflatable (29) and telescopic versions which can be collapsed and stowed against the wheel.

20 Claims, 4 Drawing Figures

VEHICLE WHEELS

This invention relates to vehicle wheels.

Tractors and other farm vehicles often have to cope with very soft or muddy conditions in which the small front wheels, particularly, are prone to sink. Vehicles for use on snow or soft sand also have this problem. Apart from the obvious inconvenience, and even danger, considerable fuel can be wasted in efforts to extricate or to drive on too narrow a tread. It is the aim of this invention to provide some means for counteracting this.

According to the present invention there is provided an attachment for fitting to a vehicle wheel comprising a body of revolution having at one axial end means for securing the attachment to the outer side of the wheel and means for exerting an axial force on the body to retain the body projecting co-axially from the wheel.

In one preferred form the body is rigid and is urged against the wheel by screw compression means. These can be operable from outside the outer end of the body, and conveniently they are retained to the wheel using the studs and existing nuts by which the wheel itself is mounted. Various arrangements are possible, as will be described, but it is desirable to have an anchorage member that can be adapted to fit various wheels with differing pitch diameters of their studs.

The body itself is preferably frusto-conical, narrowing outwardly, and can be hollow, made watertight, filled with buoyancy material or ballasted. Conveniently, the body is made in two parts, one of which will fit the rim of the wheel and provide a base against which the main part can abut. This enables the parts to be made so that they will nest together for storage or transport; for the one parts to be replaced if changing to a differently shaped wheel, without discarding the main other part; and for such main other parts to be changed to suit conditions, without discarding said one parts.

There is also envisaged an inflatable version and a telescopic one, in both of which cases the attachment can be neatly stowed against the wheel when not required.

BRIEF DESCRIPTION OF THE DRAWINGS

For a better understanding of the invention, one embodiment will now be described, by way of example, with reference to the accompanying drawing, in which:

In FIG. 1 a front wheel 1 of a tractor has a tyre channel 2 with an outer rim 3, the tyre being shown at 4. The soft ground attachment comprises a hollow body of revolution 5 in the form of a metal shell which is slightly frusto-conical tapering towards its outer end, but which towards the inner end, adjacent the wheel, reduces radially inwardly to provide a rim 6 of generally Z-section which matches the contours of the outer peripheral rim of wheel. A screw-threaded rod 7 extends coaxially through the body 5 and emerges in a recess 8 at the outer end of the body. On this projecting end there are nuts 9. At the inner end the rod 7 is engaged in a nut 10 welded to an anchor member 11 which is secured to the wheel hub. The member 11 comprises a plate 12, with an aperture for the rod and legs 13 whose feet 14 fit over the wheel studs to be secured by nuts 15. Generally, three legs will suffice and the nuts 15 are those which are normally used to secure the wheel. Many tractor front wheels have six studs, and the removal of three alternating nuts to fit the attachement does not mean loosening the wheel or jacking up the vehicle. In order to cope with stud pitch circles of various diameters, the feet 14 may have radial slots to accept the studs, rather than circular apertures.

Figure 1:
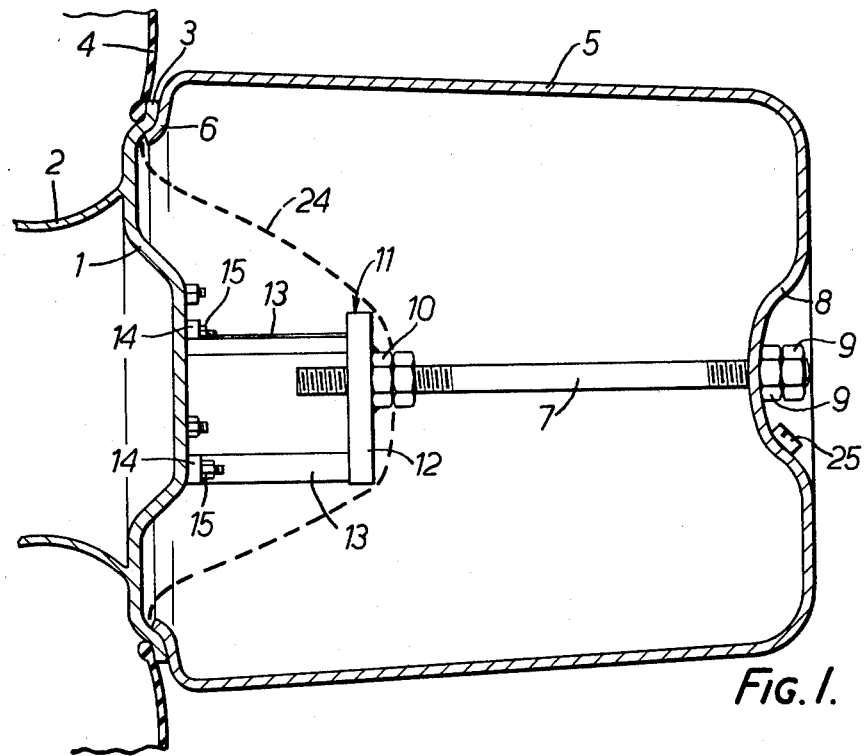
FIG. 1 is an axial section of part of a pneumatic-tyred wheel with an attachment for giving extra support on soft ground.

The attachment is fitted by first securing the anchor member 11. The rod 7 is threaded into the nut 10 to extend through the plate 12 and is adjusted to an appropriate length so that it will not project proud of the recess 8. It is secured by a lock nut. The body 5 is then positioned with its rim abutting the wheel and the rod end exposed in the recess 8. The first nut 9 is tightened to clamp the body against the wheel, and the second nut 9 locks the first.

It would be possible to make the rod 7 and anchor member 11 integral. However, it is envisaged that different bodies 5 of various axial lengths might be fitted to suit different conditions. An adjustable rod on a basic anchor member which can serve a range of bodies is therefore an economy.

Figure 2:
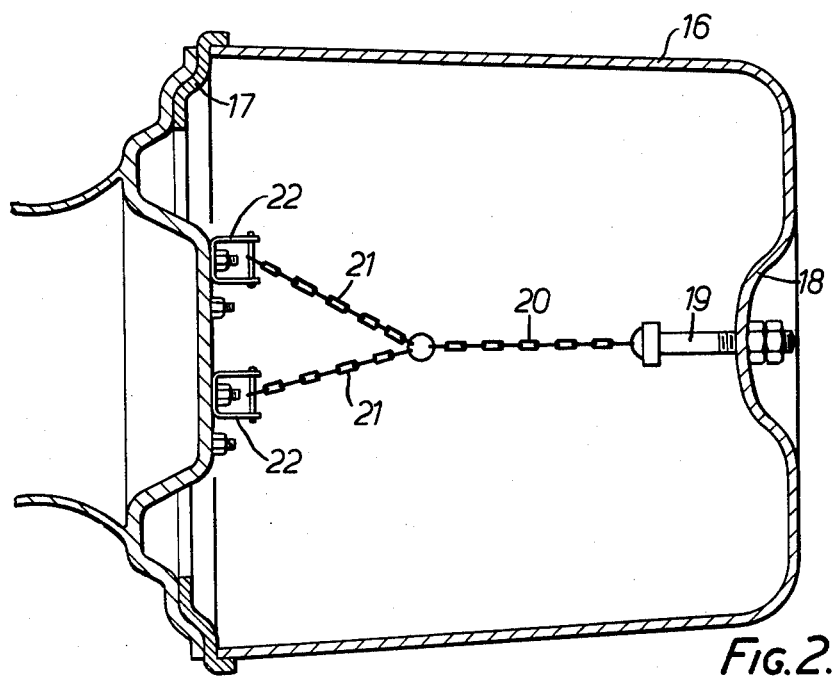
FIG. 2 is an axial section showing an alternative attachment.

The body 5 of FIG. 1 when removed has the disadvantage of not being stackable by nesting within another similar body. The arrangement of FIG. 2 is intended to overcome this. Here the body is in two parts, a main frusto-conical part 16 and a separate rim part 17. The inner, wide end of the part 16 has no inturned flange, and the angle of the cone and the shape of the recess 18 is such that close nesting with another similar part is possible. Likewise, the rims 17 can nest together. Different attachments can be achieved by substituting different frusto-conical parts 16: the rims 17 can be common to a range of different parts 16. Construction, either by moulding, spinning or pressing is also much easier.

FIG. 2 also shows a different method of anchoring. Instead of the member 11 and rod 7 there is a bolt 19, which functions as the outer end of the rod 7, and a main chain 20 with branches 21 secured to respective wheel studs. This attachment is achieved by a shackle-like member 22 on each selected stud, the bight of the "U" being flattened and apertured to fit over the wheel stud and be secured by the existing nut. A pin across the ends of the arms in normal shackle fashion is entered through the end link of the chain branch 21. With this arrangement the shackle members 22 can be left permanently fitted when the attachment is removed, without projecting inconveniently far. Fitting of different sized attachments is largely a matter of altering the chain lengths, and the pitch circle of the wheel studs is not of any concern.

In variations of this, the branches 21 could go direct to the bolt 19, and instead of chains these could be rods, making a tripod, preferably with mutual hinging at the apex to cope with various stud pitch circles. The other end of the rods will have eyes for receiving the shackle pins.

Figure 3:
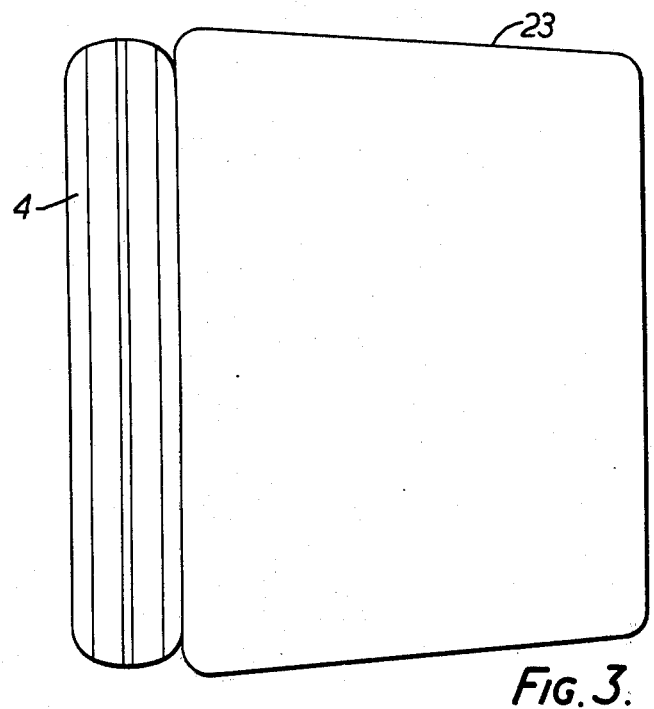
FIG. 3 is a front view of a wheel with a further attachment.

In FIGS. 1 and 2, the maximum diameter of the attachment body is well within the tyre diameter, and the complete wheel will sink some way before the attachment becomes operative. This is not always desirable, for example in the preparation of seed beds on soft ground, where compaction and rutting is readily caused by the front wheels of a tractor. It is possible to enlarge the body to match or even slightly exceed the tyre diameter, as shown at 23 in FIG. 3. Fitting may require the front end to be jacked up, although if done in the field a shallow depression can rapidly be scraped away adjacent the wheel to allow the attachment to be offered up correctly.

The frusto-conical configuration is preferred not only for stacking as in the FIG. 2 example, but also because it promotes a shearing action over the ground. This prevents build-up of soil or other material, which a purely cylindrical body would tend to promote.

The exposed surface of the body can have a tread superimposed, either directly by manufacture or by covering with a sleeve adhered to the original smooth surface. The latter would be necessary, if a tread was required, with a spun-metal body.

For some applications it may be advisable to make the hollow body watertight. With an imperforate disc wheel, this can be achieved with sealing rings around the abutting surfaces. With other wheels it would be possible to have a disc-like membrane, as indicated by broken line 24 in the example of FIG. 1, clamped centrally between nuts 10 and 15 and peripherally between the rims 3 and 6. Alternatively, the body could be largely filled with low density cellular material, such as foamed polyurethane, or have a pneumatic inner tube.

Instead of watertightness and buoyancy, it might be desired in some circumstances, such as an extra heavy load on the back of the tractor, to ballast the front. This could be done by filling the bodies at least partially with liquid or solid ballast. A filler cap 25 is shown in the recess 8 in FIG. 1.

Such attachments are not only for use on the front wheels of tractors. Larger versions are possible for the rear wheels, and they can be fitted to vehicles or trailers for traversing snow, soft sand and other surfaces where "sinking" is a danger, such as rice paddy fields.

It is possible to reverse the axial forces, having the body under tension rather than compression, and the rod under compression rather than tension. This arrangement would have the body hooking behind the rim of the wheel (slightly displacing the tyre bead) and the rod effectively abutting the hub and having screw engagement with the outer end of the body. By turning the rod, as by a handwheel, the body tends to elongate axially and contact radially, thus more firmly engaging the wheel rim. Such axial force could be achieved by other means, such as pneumatic, where blowing up an inner tube or pressurising an internal cylinder could urge the outer end of the body away from the wheel.

Figure 4:
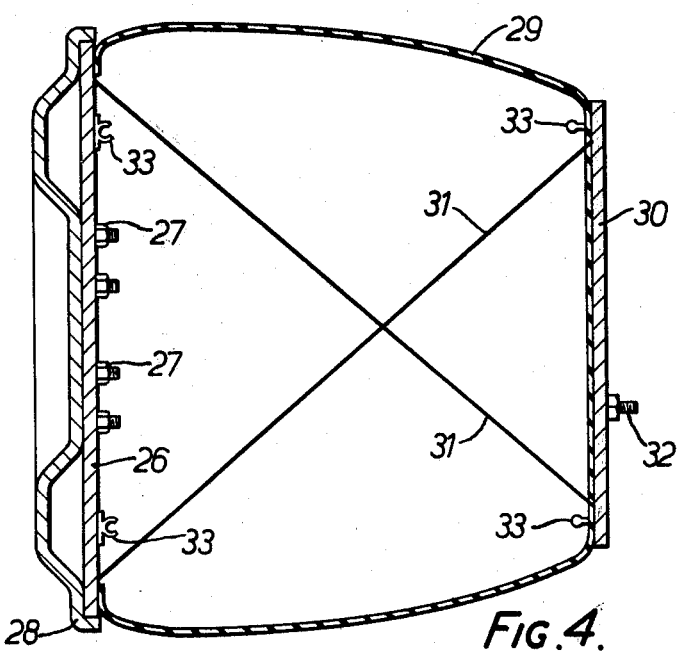
FIG. 4 is an axial section of another, inflatable attachment.

An inflatable version is also possible, as shown in FIG. 4. A disc-like plate 26 is secured over the wheel studs by the existing nuts 27 (all the studs have to be used here and possibly sealing washers to ensure airtightness) and its periphery co-operates with the rim 28 of the wheel. A generally cylindrical bag 29 has its mouth secured and sealed around this periphery, and at its outer end is re-inforced by a disc 30. For securing the plate 26 to the wheel, this end of the bag must have a sealable aperture large enough to provide access to the wheel studs. The plate 26 and disc 30 are interconnected by flexible cross-bracing 31 which comes taut when the bag is fully inflated. This inflation is through a conventional valve 32 in the disc 30 (in practice it would be recessed) and arrangements can be made to use a manually transportable air-bottle, a compressor on the vehicle, or the vehicle exhaust, as well as a hand-or foot-pump.

When not in use, the disc 30 can be collapsed against the plate 26, with the bag 29 folding concertina-fashion. The disc can be retained there by inter-engaging internal clips 33.

Various other inflatable arrangements may be possible, including one in which the inner periphery of the bag is snapped over the rim of the wheel to join the normal tyre bead. Inflation of the bag makes the sealing of this periphery more secure.

There could also be a compromise between rigid and inflatable. The body could be axially telescopic, its extension being achieved pneumatically. With several shallow cylindrical sections, decreasing in diameter axially away from the wheel, there is a close approximation to the desired frusto-conical configuration. Securing to the wheel can be as in FIG. 4. When retracted, there will be only a fairly slim disc-like assembly on the outside of the wheel, and generally this can be left in place.

In all these examples, use has been made of the studs that mount the wheel. It will be understood that it is possible to provide a wheel with separate anchorage points and secure the attachment to them.

We claim:

1. An attachment for fitting to a tyred vehicle wheel to project axially therefrom to provide auxiliary, soft group support, comprising a hollow body of revolution having at one axial end an annular rim adapted to co-operate throughout its full circumference with the rim of the tyre channel of the vehicle wheel, an anchor member for securing to the wheel hub using a circumferentially uniform array of existing threaded studs and nuts, tension means extending between the anchor member and the other axial end of the body to retain the rims in abutment, and means for adjusting the tension from outside the body.

2. An attachment for fitting to a vehicle wheel as claimed in claim 1, wherein the body of revolution is rigid.

3. An attachment for fitting to a vehicle wheel as claimed in claim 1, wherein the tensioning means is tensioned axially to compress the body against the wheel.

4. An attachment for fitting to a vehicle wheel as claimed in claim 1, wherein the tension means includes a screw-threaded element securable to the anchor member and projecting through the other axial end to receive nut actuating means.

5. An attachment for fitting to a vehicle wheel as claimed in claim 4, wherein the screw-threaded element is a rod which also has screw-threaded engagement with the anchor member.

6. An attachment for fitting to a vehicle wheel as claimed in claim 1, wherein the anchor member is a multi-legged element, each leg having means for securing to a respective stud.

7. An attachment for fitting to a vehicle wheel as claimed in claim 6, wherein the securing means is an aperture, for receiving a wheel stud, in a foot integral with the leg.

8. An attachment for fitting to a vehicle wheel as claimed in claim 7, wherein the apertures are radial slots.

9. An attachment for fitting to a vehicle wheel as claimed in claim 6, wherein the securing means is a shackle-like member with an aperture in its bight for receiving a wheel stud, there being a pin for spanning its arms and retaining the end of a respective leg of said multi-legged element.

10. An attachment for fitting to a vehicle wheel as claimed in claim 9, wherein the legs of the multi-legged elements are chains.

11. An attachment for fitting to a vehicle wheel as claimed in claim 9, wherein the legs of the multi-legged elements are rods.

12. An attachment for fitting to a vehicle wheel as claimed in claim 11, wherein the rods are articulated at the apex so that their other ends can be adjusted radially of the wheel.

13. An attachment for fitting to a vehicle wheel as claimed in claim 1, wherein the body is in two parts, the first part being an annulus with a configuration to fit the wheel rim, and the second part being generally frusto-conical.

14. An attachment for fitting to a vehicle wheel as claimed in claim 1, wherein the body is hollow and sealing means are provided to make the attachment watertight.

15. An attachment for fitting to a vehicle wheel as claimed in claim 1, wherein the body has an outer shell with an interior filling of buoyancy material.

16. An attachment for fitting to a vehicle wheel as claimed in claim 1, wherein the body is hollow and there are means for at least partially filling the body with ballast.

17. An attachment for fitting to a vehicle wheel as claimed in claim 1, wherein the body is at least partially flexible and inflatable.

18. An attachment for fitting to a vehicle wheel as claimed in claim 17, wherein the anchor member is a plate closing one end of a bag, and a disc the other, the plate the bag being inter-connected by flexible cross-bracing constituting said tension means, and the tension adjusting means being provided by means for inflating the bag.

19. An attachment for fitting to a vehicle wheel as claimed in claim 18, wherein means are provided for retaining the disc to the plate when the bag is deflated.

20. An attachment for fitting to a vehicle wheel, as claimed in claim 1, wherein the body is axially telescopic.

* * * * *